US010595504B2

(12) United States Patent
Bahr et al.

(10) Patent No.: US 10,595,504 B2
(45) Date of Patent: Mar. 24, 2020

(54) EXPANDABLE PET TUNNEL SYSTEM

(71) Applicant: PAMPERED PET PARTIES, LLC, Marietta, GA (US)

(72) Inventors: Lynn Bahr, Marietta, GA (US); Candice Sides, Woodstock, GA (US)

(*) Notice: Subject to any disclaimer, the term of this patent is extended or adjusted under 35 U.S.C. 154(b) by 267 days.

(21) Appl. No.: 15/495,203

(22) Filed: Apr. 24, 2017

(65) Prior Publication Data
US 2017/0223929 A1    Aug. 10, 2017

Related U.S. Application Data

(63) Continuation-in-part of application No. 15/176,976, filed on Jun. 8, 2016, now abandoned.

(60) Provisional application No. 62/172,328, filed on Jun. 8, 2015.

(51) Int. Cl.
| A01K 1/03 | (2006.01) |
| A01K 15/02 | (2006.01) |
| A01K 15/04 | (2006.01) |
| A01K 1/035 | (2006.01) |

(52) U.S. Cl.
CPC .............. *A01K 1/033* (2013.01); *A01K 1/035* (2013.01); *A01K 15/02* (2013.01); *A01K 15/025* (2013.01); *A01K 15/04* (2013.01)

(58) Field of Classification Search
CPC ........ A01K 1/033; A01K 1/035; A01K 15/02; A01K 15/04; A01K 15/025
See application file for complete search history.

(56) References Cited

U.S. PATENT DOCUMENTS

| 4,301,766 A * | 11/1981 | Piccone | A01K 1/035 119/482 |
| 5,618,246 A * | 4/1997 | Zheng | A63B 9/00 135/126 |
| 2001/0035203 A1* | 11/2001 | Clee | A01G 9/16 135/87 |
| 2003/0003840 A1* | 1/2003 | Hsu | A63B 5/11 446/221 |
| 2006/0037553 A1* | 2/2006 | Miller | A01K 1/0254 119/497 |
| 2014/0305379 A1* | 10/2014 | Ballentyne | A01K 1/033 119/498 |

* cited by examiner

*Primary Examiner* — Jessica B Wong
(74) *Attorney, Agent, or Firm* — Smith Tempel Blaha LLC; Matthew T. Hoots

(57) ABSTRACT

Various embodiments, aspects and features of the present invention encompass an expandable pet tunnel system. It is envisioned that embodiments of the solution for an expandable pet tunnel system may have components constructed from any material suitable for a given application, although preferred embodiments may be constructed from kraft paper. Components of an exemplary embodiment may be constructed of a relatively thick paper and reside in either a collapsed state or an expanded state. Pet tunnel components and connector box components may expand "accordion-like" according to a series of gussets or folds in the sidewalls of each component and then connected, one to the next, by aligning entry/exit ports to modularly build a tunnel system.

6 Claims, 8 Drawing Sheets

EXPANDABLE PET TUNNEL SYSTEM

CROSS-REFERENCE TO RELATED APPLICATIONS

This application is a continuation-in-part of the U.S. non-provisional application entitled "EXPANDABLE PET TUNNEL DEVICE," filed on Jun. 8, 2016, and assigned application Ser. No. 15/176,976 which claims priority under 35 U.S.C. § 119(e) to the U.S. provisional application entitled "EXPANDABLE PET TUNNEL DEVICE," filed on Jun. 8, 2015 and assigned application Ser. No. 62/172,328. The entire contents of both Ser. No. 15/176,976 and 62/172,328 are hereby incorporated by reference.

BACKGROUND

The present invention relates to toys and products for pets and, more particularly, to an expandable pet tunnel device constructed from durable "kraft" paper such as may be used in traditional paper grocery bags. Pet tunnel devices known in the art are commonly marketed for use by various types of pets including, but not limited to, cats, ferrets, mice, small dogs, etc. As pet owners know all too well, pets can be destructive users of toys and devices, and their use of pet tunnel devices is no less destructive.

For example, pet tunnels known in the art can be expensive devices in the form of fabric "tubes" or open ended box-like structures that pets eagerly run through and hide in. Naturally, through such normal use, sharp claws and excited fits of chewing can quickly destroy a pet tunnel, leaving the pet owner with a choice between replacing the expensive device or depriving her beloved pet from the joy of having its own tunnel.

Therefore, what is needed in the art is a pet tunnel device that is inexpensive to manufacture and to replace. Moreover, what is needed in the art is an expandable pet tunnel device configured for construction from a durable, yet recyclable, material such as kraft paper.

BRIEF SUMMARY OF THE INVENTION

Various embodiments, aspects and features of the present invention encompass an expandable pet tunnel. It is envisioned that the solution may be constructed according to any given size suitable for use by a given animal. That is, it is envisioned that the solution is not limited by size and that certain embodiments may be sized appropriately for animals ranging in size from a mouse or gerbil to a large dog. Also, it is envisioned that embodiments of the solution for an expandable pet tunnel may be constructed from any material suitable for a given application, although a preferred embodiment may be constructed from kraft paper such as that which is well known for use in paper grocery bags. The optimum basis weight of the kraft paper used for a given embodiment will occur to those of skill in the art, the basis weight being the thickness of the kraft paper. As one of ordinary skill in the art of paper understands, as the measure of basis weight climbs in number, so grows the thickness of the paper with which it is associated. For example, paper with a basis weight of 30 lbs. to 49 lbs. may be marked as "standard duty," while paper associated with a basis weight of 50 lbs. and up may be marked as "heavy duty."

An exemplary embodiment of the solution is sized ideally for a cat or small dog, such as a dachshund. The exemplary embodiment may be constructed of a relatively thick paper and reside in either a collapsed state or an expanded state. When in the collapsed state, the exemplary embodiment may take the shape of a square. When in the expanded state, the exemplary embodiment may take the shape of a rectangular tube or tunnel that is open at either or both of its ends. When transitioning from the collapsed state to the expanded state, the exemplary embodiment may expand "accordion-like" according to a series of gussets or folds in the sidewalls of the embodiment.

Advantageously, because an embodiment of the solution may be expanded from a collapsed state to an expanded state, an unused pet tunnel according to the novel solution may be conveniently stored in the collapsed state and then expanded only when called into duty for the benefit of the pet. As a further advantage, because the exemplary embodiment is constructed of paper, it may be discarded or recycled when its usefulness has waned due to wear and tear from a loving pet.

An exemplary expandable pet tunnel system may comprise two or more expandable pet tunnels and at least one connector box. Each expandable pet tunnel may be comprised of a tube having four sides, a front face and a back face. Further, each of the four sides of each expandable pet tunnel may comprise one or more creases such that the expandable pet tunnel may be transitioned between a collapsed state and an expanded state. Further, each of the front face and the back face of each expandable pet tunnel may comprise an entry/exit portal. Likewise, the at least one connector box may also comprise at least two entry/exit portals. The tunnel components and the connector box components may be constructed from kraft paper and, in some embodiments, the front and/or back faces of each expandable pet tunnel and/or one or more faces of the connector box may comprise a reinforcement layer. Further, outer surfaces of one or more of the tunnels and connector box may comprise an adhesive for affixing one tunnel to another, either directly or via a connector box. As an alternative to an adhesive for affixing one tunnel to another or to a connector box, outer surfaces of one or more components may include hook and loop patches (e.g., VELCRO).

In some embodiments of a pet tunnel system, a first two of the four sides of each expandable pet tunnel may consist of a series of vertical and diagonal creases while a second two of the four sides of each expandable pet tunnel consists of a set or series of vertical creases.

In some embodiments of a pet tunnel system, each of the four sides of each expandable pet tunnel may consist of a set or series of vertical and diagonal creases.

In some embodiments of a pet tunnel system, a first two of the four sides of each expandable pet tunnel may consist of a set or series of vertical, horizontal and diagonal creases while a second two of the four sides of each expandable pet tunnel consists of a set or series of vertical creases.

In some embodiments of a pet tunnel system, a first two of the six sides of the at least one connector box may each consist of a vertical crease while a second two of the six sides of the at least one connector box each consists of a set or series of vertical and diagonal creases.

Embodiments of an expandable pet tunnel system according to the solution are not limited to the exemplary aspects and features described above or below. Certain embodiments may include additional features, or different features, while other embodiments include alternative features.

BRIEF DESCRIPTION OF THE DRAWINGS

In the drawings, like reference numerals refer to like parts throughout the various views unless otherwise indicated. For reference numerals with letter character designations such as "102A" or "102B", the letter character designations may differentiate two like parts or elements present in the same figure or different figures. Letter character designations for reference numerals may be omitted when it is intended that a reference numeral encompass all parts having the same reference numeral in all figures.

DESCRIPTION

The Figures and the related description are offered for illustrative purposes and depict exemplary embodiments and aspects of an expandable pet tunnel system according to the solution. As such, the exemplary embodiments and aspects shown in the Figures do not necessarily illustrate all features, aspects and configurations that may be included in a given embodiment of an expandable pet tunnel system according to the solution. For instance, it is envisioned that an expandable pet tunnel system according to the solution may be manufactured to any given size suitable for a particular pet and/or may be constructed from any combination of materials depending on the intended use of the particular embodiment. Moreover, although the exemplary embodiments shown in the Figures are constructed based on a tube with a square cross-section, it is envisioned that other embodiments may be constructed based on a tube with a round cross-section or a multi-walled cross-section. Further, although the exemplary embodiments of the pet tunnel aspects shown in the Figures feature only a pair of entry/exit portals at their ends, it is envisioned that certain embodiments of pet tunnels may feature entry/exit portals at one or more locations on the side walls in addition to, or in lieu of, the entry/exit portals located on the ends. Similarly, although the exemplary embodiment of a connector box shown in the Figures suggests entry/exit portals on five of the six sidewalls, it is envisioned that a connector box element may feature any combination of entry/exit portals on the sidewalls useful for connecting two or more pet tunnels into a system. As such, it is envisioned that multiple expandable pet tunnels may be arranged into a system of tunnels by either juxtaposing an entry/exit portal of one expandable pet tunnel with an entry/exit portal of another expandable pet tunnel or by joining entry/exit portals of two or more expandable pet tunnels via a connector box. Even further, it is envisioned that the outer surfaces and/or sides of certain embodiments of an expandable pet tunnel and/or connector box may feature an adhesive or some other means of attachment for facilitating the juxtaposition of two or more expandable pet tunnels and/or connector boxes into a system.

Figure 1:
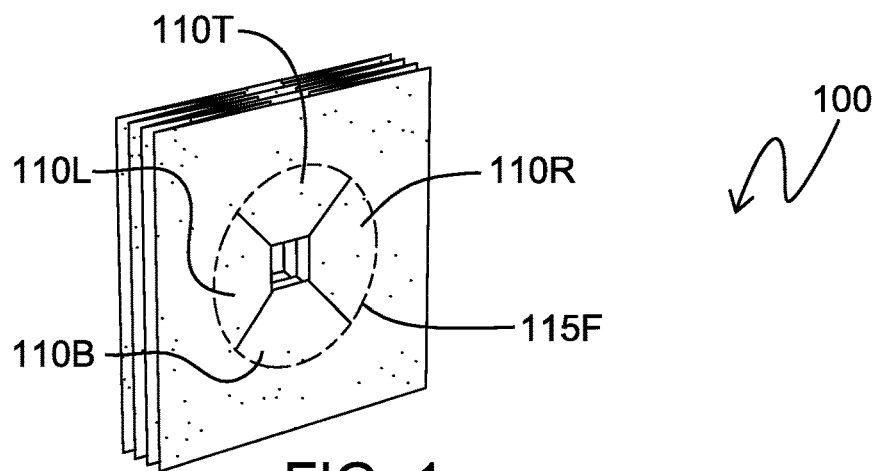
FIG. 1 is a front perspective view of an exemplary embodiment of an expandable pet tunnel according to the solution, shown in a collapsed state.
Figure 2:
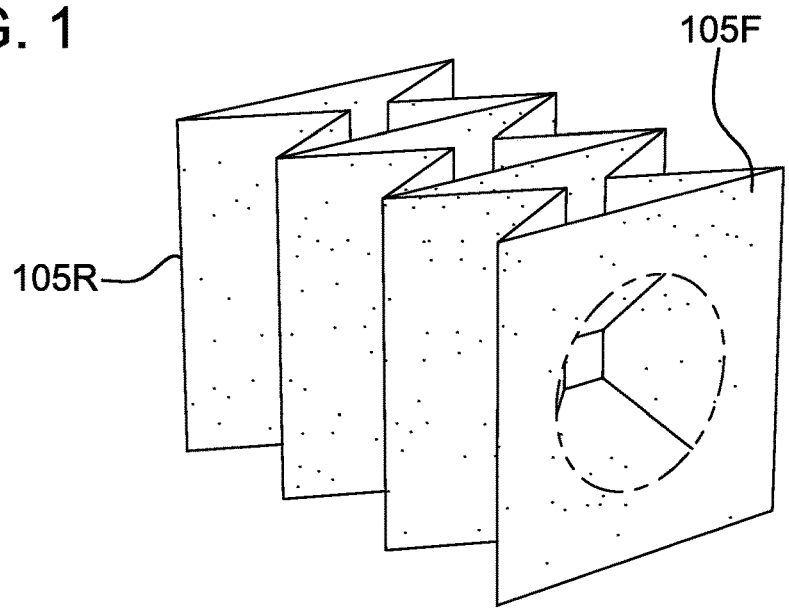
FIG. 2 is a front perspective view of the exemplary embodiment of an expandable pet tunnel in FIG. 1, shown in a partially expanded state.
Figure 3:
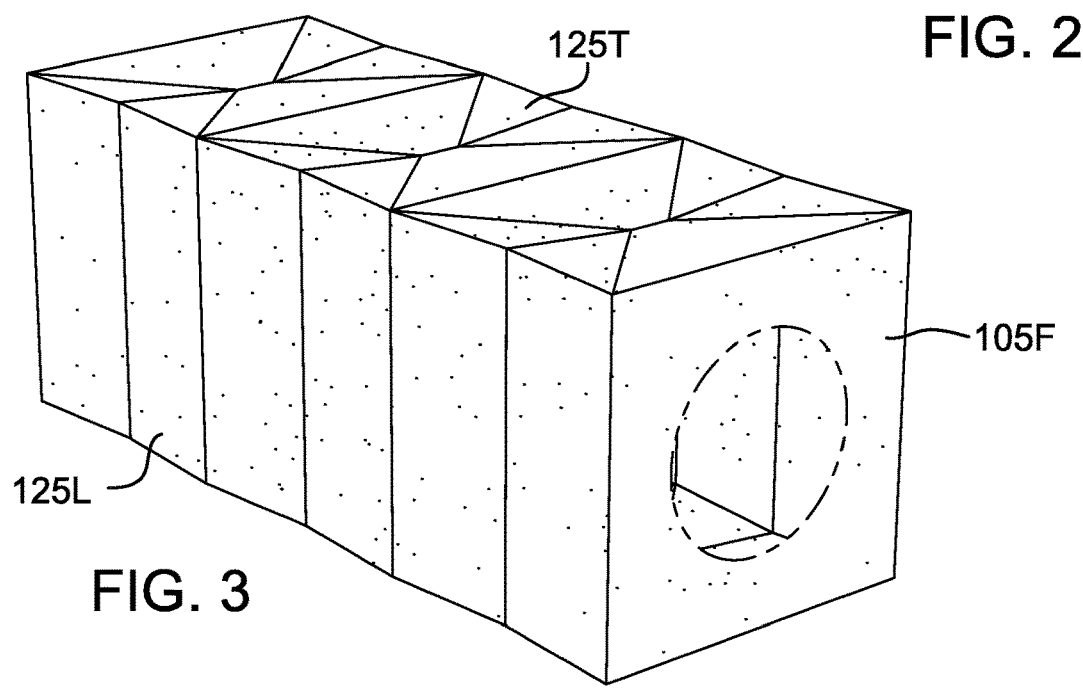
FIG. 3 is a front perspective view of the exemplary embodiment of an expandable pet tunnel in FIG. 1, shown in a fully expanded state.
Figure 4A:
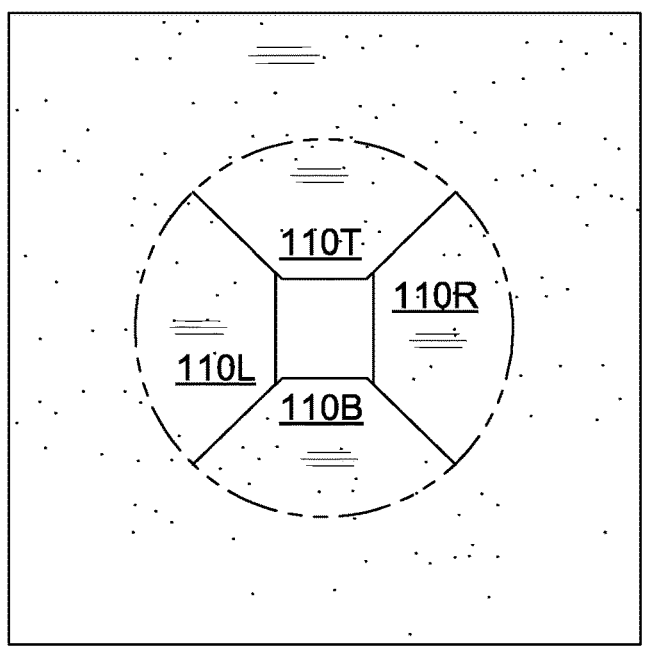
FIG. 4A is a front-view of the exemplary embodiment of an expandable pet tunnel in FIG. 1, shown in a collapsed state.
Figure 4B:
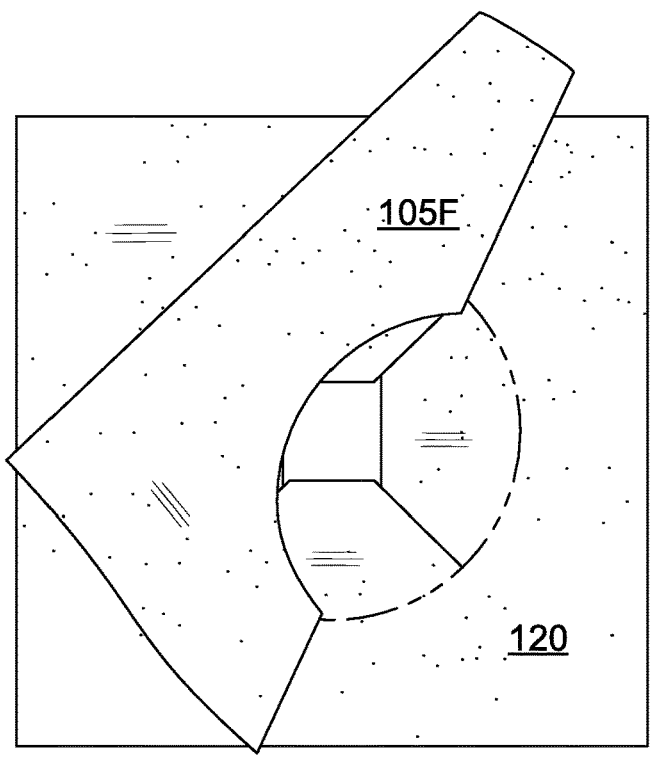
FIG. 4B is a front view of the exemplary embodiment of an expandable pet tunnel in FIG. 1, shown with an outer front face element folded back to expose an interior reinforcement feature.
Figure 5:
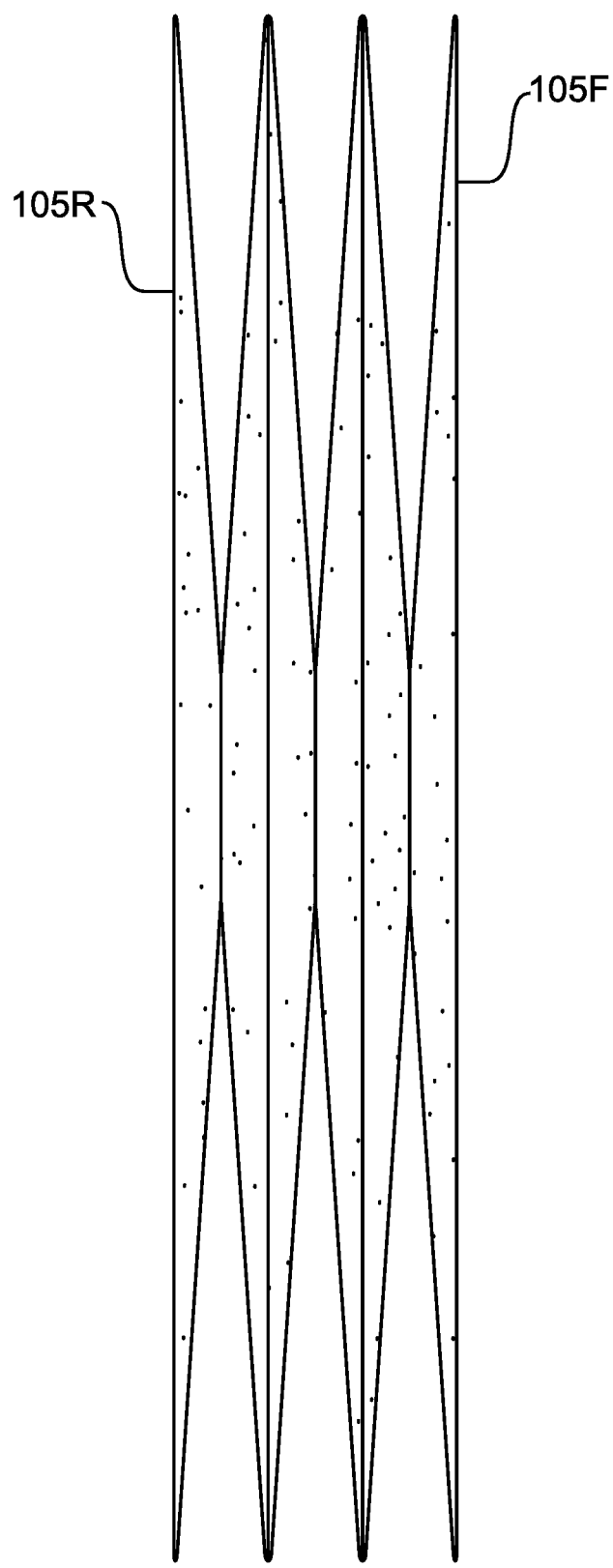
FIG. 5 is a top view of the exemplary embodiment of an expandable pet tunnel in FIG. 1, shown in a collapsed state.
Figure 6:
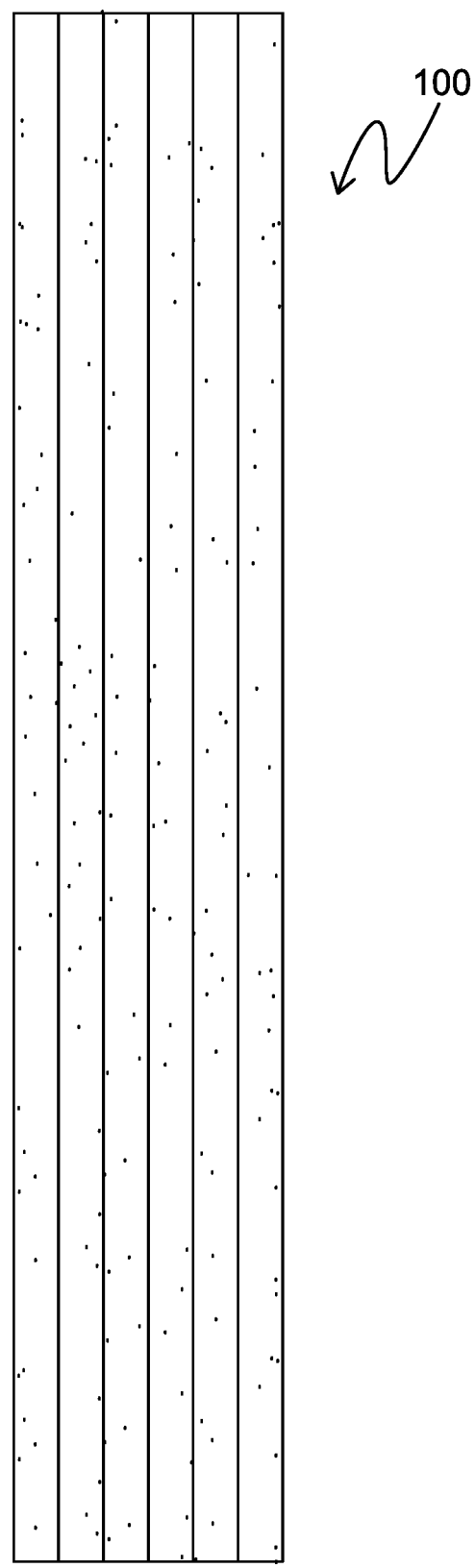
FIG. 6 is a side view of the exemplary embodiment of an expandable pet tunnel in FIG. 1, shown in a collapsed state.
Figure 7:
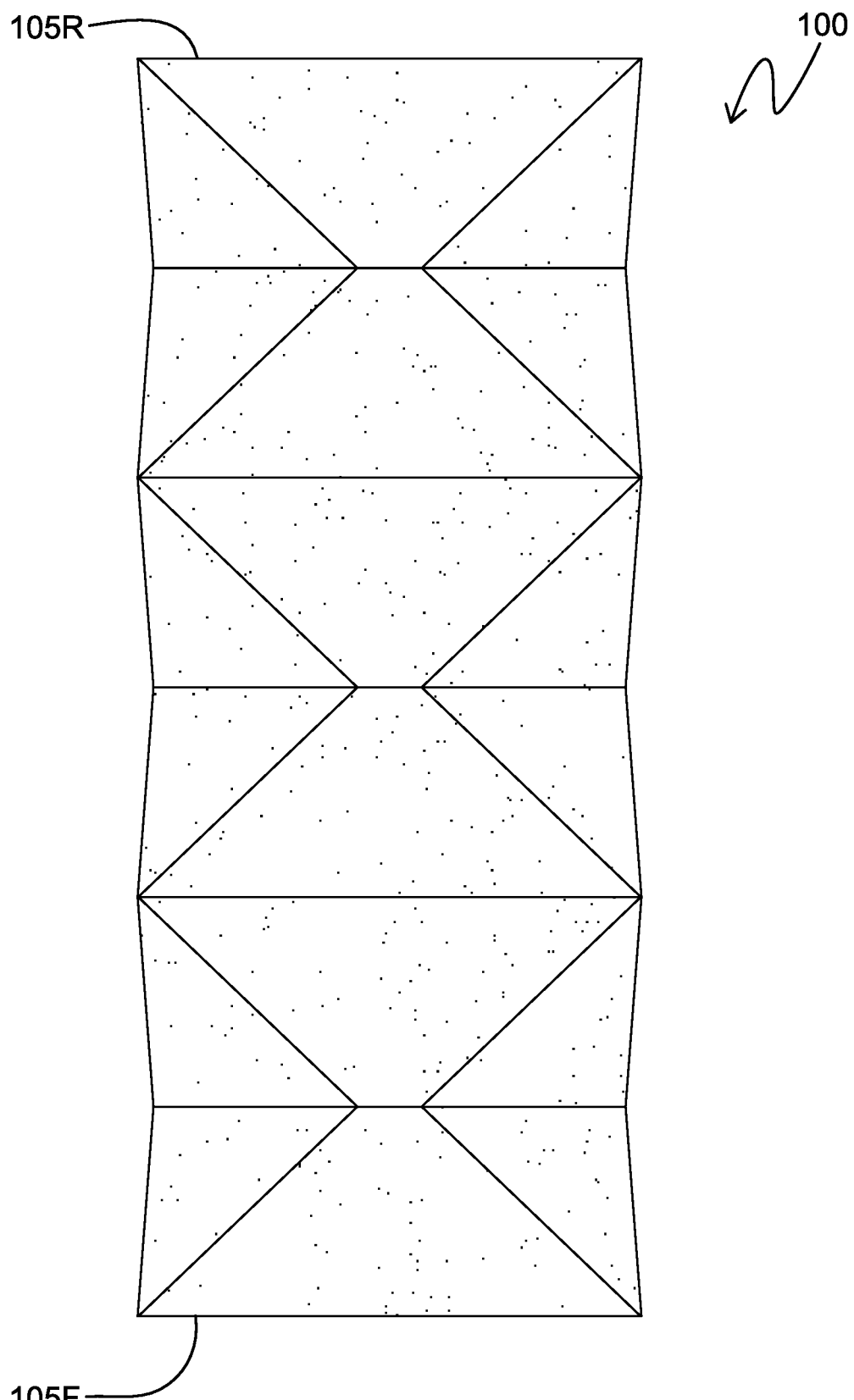
FIG. 7 is a top view of the exemplary embodiment of an expandable pet tunnel in FIG. 1, shown in a fully expanded state.
Figure 8:
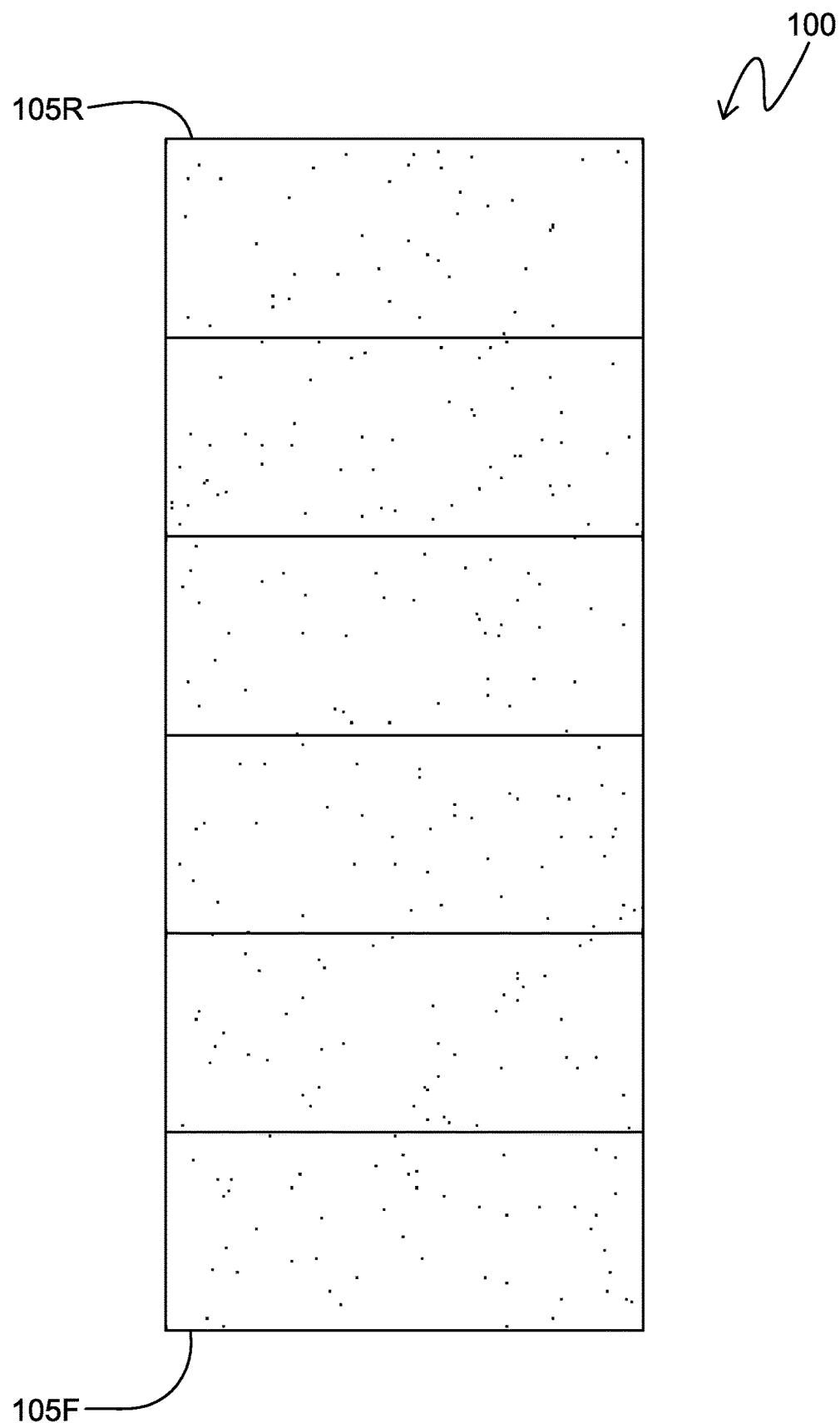
FIG. 8 is a side view of the exemplary embodiment of an expandable pet tunnel in FIG. 1, shown in a fully expanded state.

FIGS. 1-8 collectively depict an exemplary embodiment of an expandable pet tunnel 100 and so are described herein as if they were one figure. As such, aspects of the exemplary embodiment that are referenced in this description may be evident in one or more of FIGS. 1-8. FIG. 1 is a front perspective view of an exemplary embodiment of an expandable pet tunnel 100 according to the solution, shown in a collapsed state. FIG. 2 is a front perspective view of the exemplary embodiment of an expandable pet tunnel 100 in FIG. 1, shown in a partially expanded state. FIG. 3 is a front perspective view of the exemplary embodiment of an expandable pet tunnel 100 in FIG. 1, shown in a fully expanded state. FIG. 4A is a front-view of the exemplary embodiment of an expandable pet tunnel 100 in FIG. 1, shown in a collapsed state. FIG. 4B is a front view of the exemplary embodiment of an expandable pet tunnel 100 in FIG. 1, shown with an outer front face element folded back to expose an interior reinforcement feature. FIG. 5 is a top view of the exemplary embodiment of an expandable pet tunnel 100 in FIG. 1, shown in a collapsed state. FIG. 6 is a side view of the exemplary embodiment of an expandable pet tunnel 100 in FIG. 1, shown in a collapsed state. FIG. 7 is a top view of the exemplary embodiment of an expandable pet tunnel 100 in FIG. 1, shown in a fully expanded state. FIG. 8 is a side view of the exemplary embodiment of an expandable pet tunnel 100 in FIG. 1, shown in a fully expanded state.

Referring to FIGS. 1-8, an outer front face 105F defines a round front portal 115F. In the exemplary embodiment, the entry/exit portals 115 are depicted in a circular form, although it is envisioned that other embodiments of the solution may feature entry/exit portals defining shapes other than a circle. As such, the scope of an expandable pet tunnel is not limited by any particular shape of an entry/exit portal as different shapes for entry/exit portals will occur to those of ordinary skill in the art.

Returning to the exemplary embodiment depicted in FIGS. 1-8, interior walls 110 can be seen through front portal 115F when the embodiment is in a partially collapsed or collapsed state. Because the exemplary embodiment is designed to be expanded into a tunnel having a square cross-section along its length with front and rear entry exit portals 115 at either end, when the embodiment is collapsed the left 110L, right 110R, top 110T and bottom 110B interior walls can be partially seen through an entry/exit portal 115.

With an outer front face element 105F folded back, an interior reinforcement feature 120 is exposed (see FIG. 4B). Although all embodiments of the solution may not include an interior reinforcement feature 120, it is envisioned that certain embodiments may include an interior reinforcement feature 120 for the purpose of adding structural rigidity to the solution when in an expanded state. Further, it is envisioned that the inclusion of an interior reinforcement feature 120 may prolong the useful life of an expandable pet tunnel system as the area around the entry/exit portals 115 may be susceptible to relatively more wear and tear.

It can be seen from the FIGS. 1-8 that the exemplary embodiment features a series of folds or gussets along the sidewalls such that the front and rear faces 105 are in close proximity when the embodiment is in a collapsed state. When the exemplary embodiment is expanded from the fully collapsed state (such as shown in FIG. 1) to the fully expanded state (such as shown in FIG. 3), outer sidewalls 125 are formed from the extension of the various folds and gussets. The various gussets and creases that allowed the side walls 125 to be collapsed also provide for the embodiment to be expanded such that a complete tunnel is formed with outer walls 125 and inner walls 110.

Figure 9:
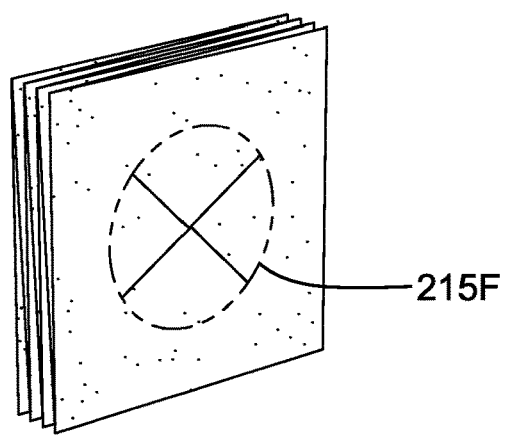
FIG. 9 is a front perspective view of an exemplary embodiment of an expandable pet tunnel according to the solution, shown in a collapsed state.
Figure 10:
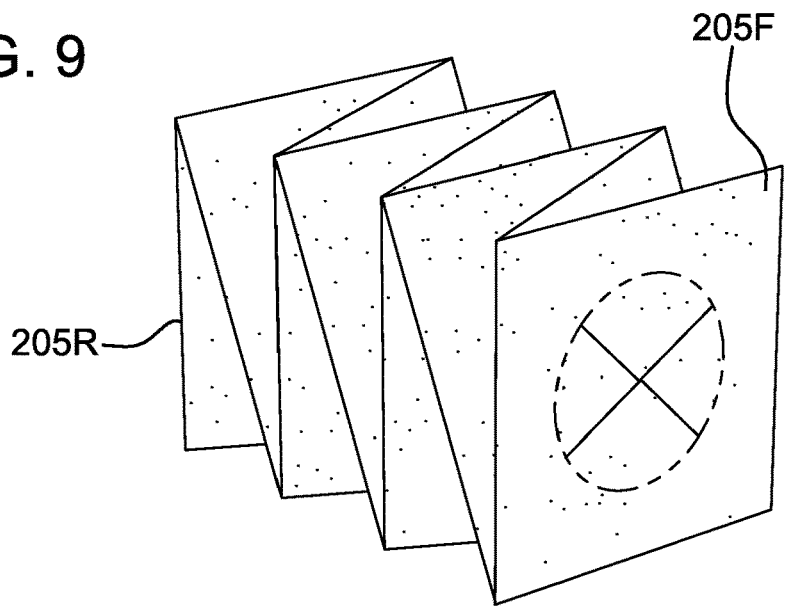
FIG. 10 is a front perspective view of the exemplary embodiment of an expandable pet tunnel in FIG. 9, shown in a partially expanded state.
Figure 11:
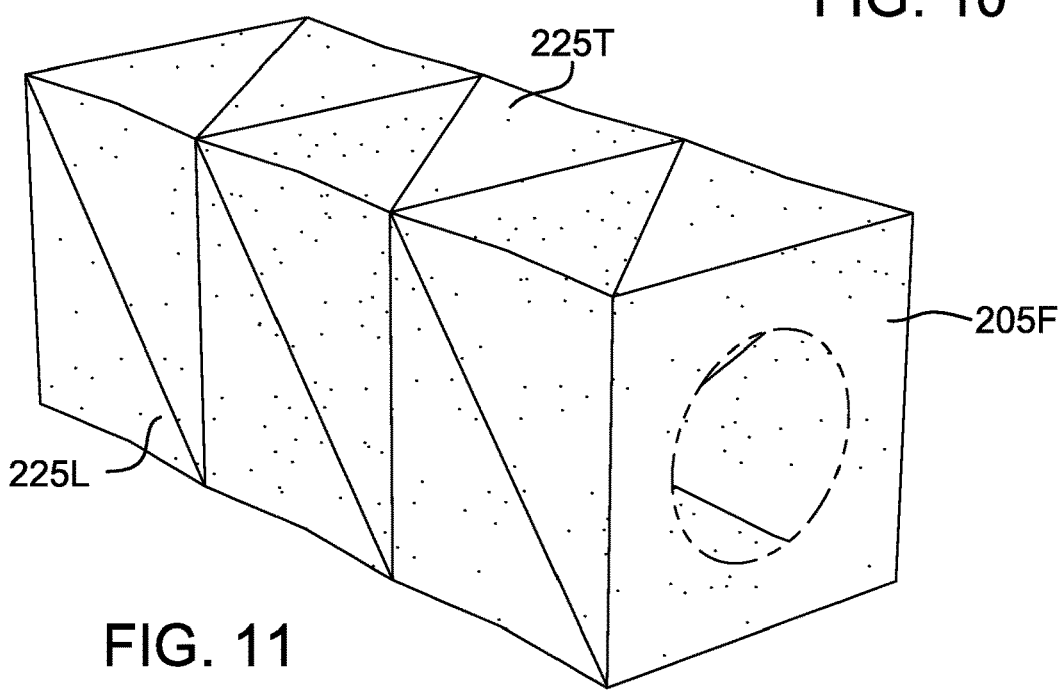
FIG. 11 is a front perspective view of the exemplary embodiment of an expandable pet tunnel in FIG. 9, shown in a fully expanded state.

FIGS. 9-11 collectively depict an exemplary embodiment of an expandable pet tunnel 200 and so are described herein as if they were one figure. FIG. 9 is a front perspective view of an exemplary embodiment of an expandable pet tunnel 200 according to the solution, shown in a collapsed state. FIG. 10 is a front perspective view of the exemplary embodiment of an expandable pet tunnel 200 in FIG. 9, shown in a partially expanded state. FIG. 11 is a front perspective view of the exemplary embodiment of an expandable pet tunnel 200 in FIG. 9, shown in a fully expanded state.

It can be seen from the FIGS. 9-11 that the exemplary embodiment features a series of folds or gussets along the sidewalls such that the front and rear faces 205 are in close proximity when the embodiment is in a collapsed state. When the exemplary embodiment is expanded from the fully collapsed state (such as shown in FIG. 9) to the fully expanded state (such as shown in FIG. 11), outer sidewalls 225 are formed from the extension of the various folds and gussets. The various gussets and creases that allowed the side walls 225 to be collapsed also provide for the embodiment to be expanded such that a complete tunnel is formed with outer walls 225 and inner walls 210.

Figure 12:
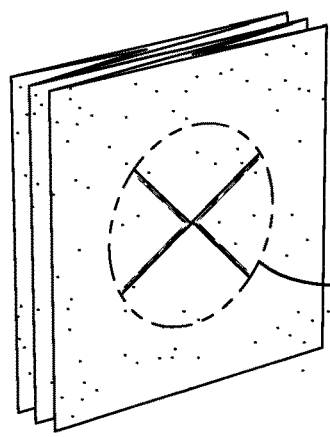
FIG. 12 is a front perspective view of an exemplary embodiment of an expandable pet tunnel according to the solution, shown in a collapsed state.
Figure 13:
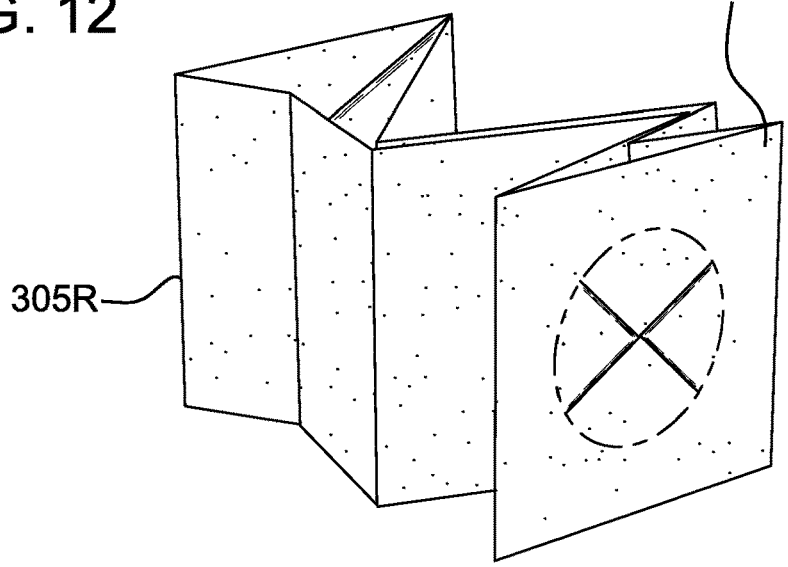
FIG. 13 is a front perspective view of the exemplary embodiment of an expandable pet tunnel in FIG. 12, shown in a partially expanded state.
Figure 14:
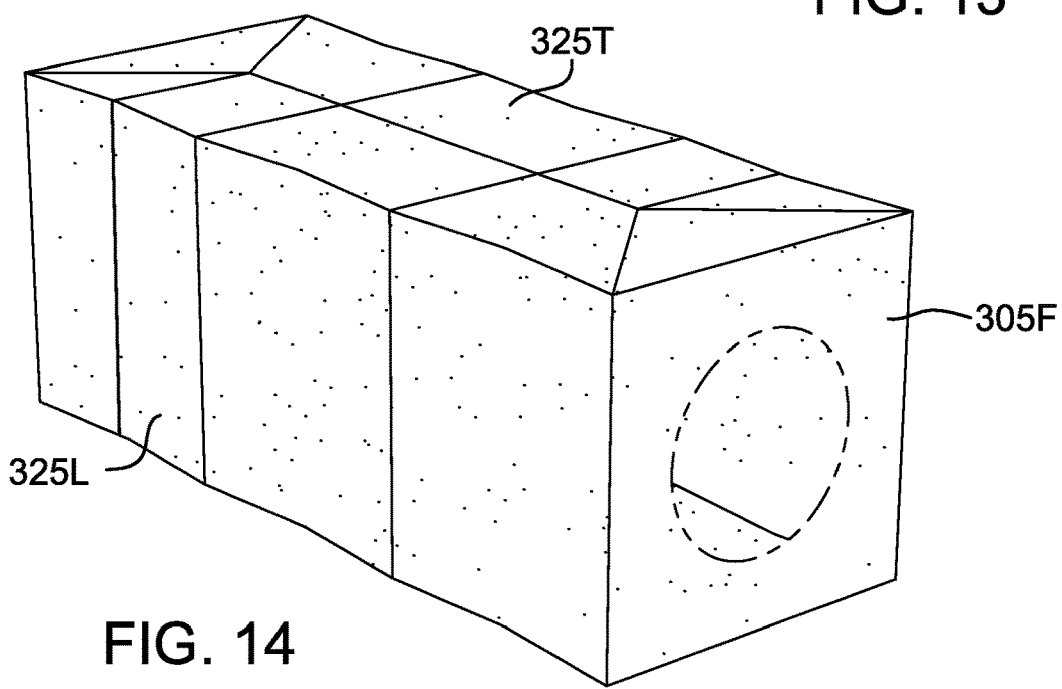
FIG. 14 is a front perspective view of the exemplary embodiment of an expandable pet tunnel in FIG. 12, shown in a fully expanded state.

FIGS. 12-14 collectively depict an exemplary embodiment of an expandable pet tunnel 300 and so are described herein as if they were one figure. FIG. 12 is a front perspective view of an exemplary embodiment of an expandable pet tunnel 300 according to the solution, shown in a collapsed state. FIG. 13 is a front perspective view of the exemplary embodiment of an expandable pet tunnel 300 in FIG. 12, shown in a partially expanded state. FIG. 14 is a front perspective view of the exemplary embodiment of an expandable pet tunnel 300 in FIG. 12, shown in a fully expanded state.

It can be seen from the FIGS. 12-14 that the exemplary embodiment features a series of folds or gussets along the sidewalls such that the front and rear faces 305 are in close proximity when the embodiment is in a collapsed state. When the exemplary embodiment is expanded from the fully collapsed state (such as shown in FIG. 12) to the fully expanded state (such as shown in FIG. 14), outer sidewalls 325 are formed from the extension of the various folds and gussets. The various gussets and creases that allowed the side walls 325 to be collapsed also provide for the embodiment to be expanded such that a complete tunnel is formed with outer walls 325 and inner walls 310.

Figure 15:
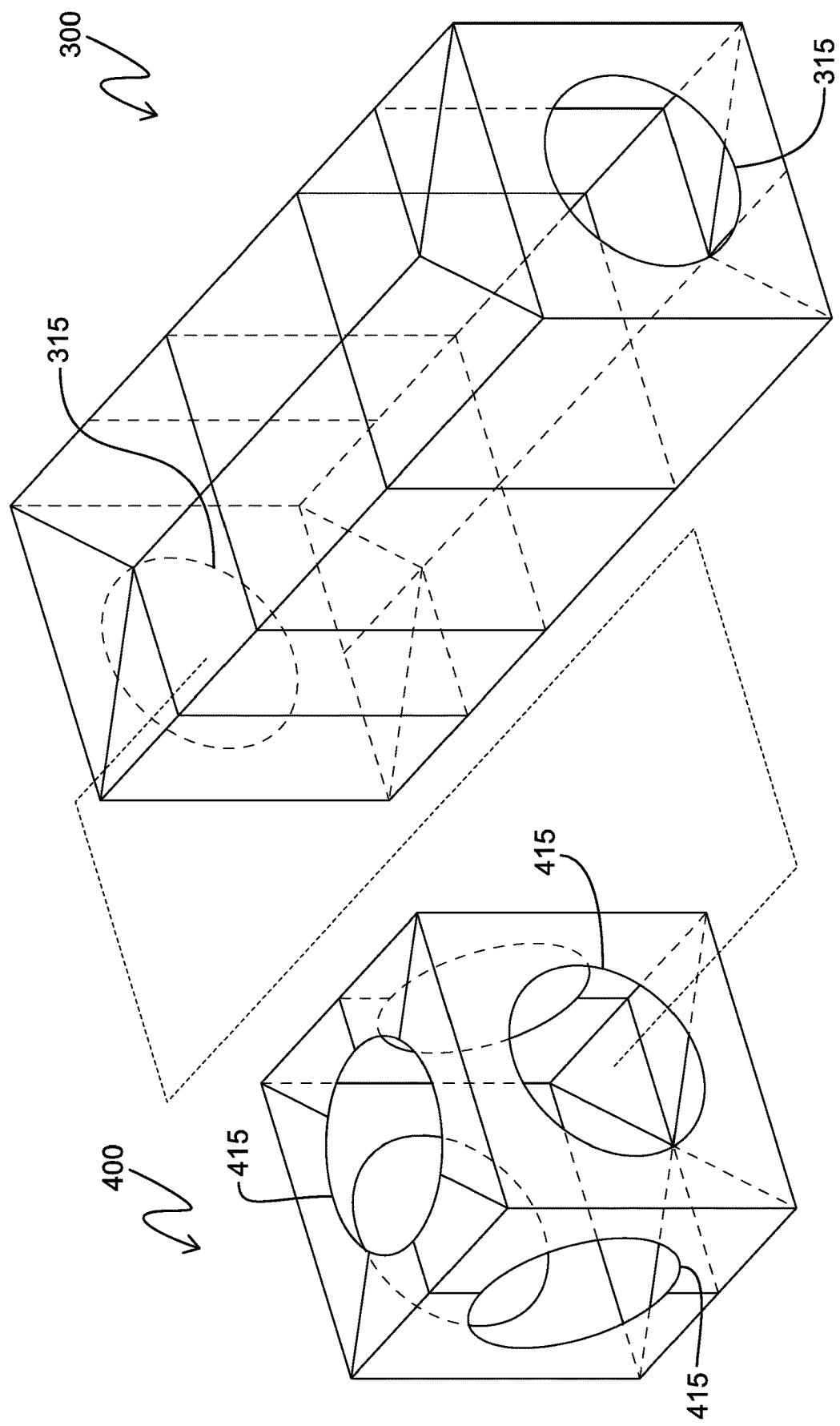
FIG. 15 is a perspective "see-through" view of an exemplary embodiment of an expandable pet tunnel system including an exemplary expandable pet tunnel and a connector box for modular assembly of the expandable pet tunnel to one or more other expandable pet tunnels (not shown).

FIG. 15 is a perspective "see-through" view of an exemplary embodiment of an expandable pet tunnel system including the exemplary expandable pet tunnel 300 shown and described relative to FIGS. 12-14 and a connector box 400 for modular assembly and connection of the expandable pet tunnel 300 to one or more other expandable pet tunnels (not shown in FIG. 15 illustration). As can be understood from the FIG. 15 illustration, the connector box 400 may be juxtaposed to the expandable pet tunnel 300 such that an entry/exit portal 415 on the connector box is aligned with an entry/exit portal 315 of the pet tunnel 300. It is envisioned that any one or more of the surfaces of the connector box 400 and/or the pet tunnel 300 may include an adhesive, hook and loop patch, or the like for positioning and securing juxtaposed entry/exit portals 405.

Notably, although the system depicted in FIG. 15 illustrates a connector box 400 and an expandable pet tunnel 300, it is envisioned that an expandable pet tunnel system may comprise any number of connector boxes 400 and expandable pet tunnels 100, 200, 300. Advantageously, via juxtaposition of entry/exit portals, an expandable pet tunnel system provides for practically endless combinations of pet tunnels 100, 200, 300 and/or connector boxes 400. Moreover, although the exemplary connector box 400 depicts entry/exit portals 415 on five of its six walls, it is envisioned that any number or combination of walls of a connector box 400 may include entry/exit portals 415 and, as such, a connector box 400 of an expandable pet tunnel system is not limited to including exactly five entry/exit portals 415.

Exemplary embodiments of an expandable pet tunnel solution have been described using detailed descriptions of the embodiments thereof that is provided by way of example and is not intended to limit the scope of the disclosure. The described embodiments comprise different features, not all of which are required in all embodiments of an expandable pet tunnel according to the solution. Some embodiments of an expandable pet tunnel utilize only some of the features or possible combinations of the features. Variations of the exemplary embodiments of an expandable pet tunnel that are described and embodiments of an expandable pet tunnel comprising different combinations of features noted in the described embodiments will occur to persons of the art.

It will be appreciated by persons skilled in the art that an expandable pet tunnel according to the solution is not limited by what has been particularly shown and described herein above. Rather, the scope of an expandable pet tunnel is defined by the claims that follow.

What is claimed is:

1. An expandable pet tunnel system configured to promote pet activity, comprising:

one or more expandable pet tunnels comprised of kraft paper and configured to transition between a substantially flat collapsed state and an expanded state, wherein:
  each of the one or more expandable pet tunnels, in the expanded state, defines a tube with a quadrilateral cross-section, the tube consisting of four single layer sides, a front face and a back face;
  at least one of the front face and the back face of each of the one or more expandable pet tunnels comprises an entry/exit portal;
  each of the four single layer sides of each of the one or more expandable pet tunnels comprises one or more creases such that the expandable pet tunnel may be transitioned in an accordion-like manner between the substantially flat collapsed state and the expanded state;
  when each of the one or more expandable pet tunnels is in the expanded state, said creases operate to make each of the four single layer sides define a substantially flat surface; and
  when each of the one or more expandable pet tunnels is in the substantially flat collapsed state, said creases operate to fold each of the four single layer sides in an inward direction such that the front face and back face maintain their shape and are substantially juxtaposed.

2. The expandable pet tunnel system of claim 1, wherein at least one of the front face and back face of each of the one or more expandable pet tunnels further comprises a reinforcement layer.

3. The expandable pet tunnel system of claim 1, further comprising an adhesive on one or more of the four sides, front face and back face of at least one of the one or more expandable pet tunnels.

4. The expandable pet tunnel system of claim 1, further comprising a hook and loop patch on one or more of the four sides, front face and back face of at least one of the one or more expandable pet tunnels.

5. The expandable pet tunnel system of claim 1, wherein each of the four single layer sides of each of the one or more expandable pet tunnels comprising one or more creases consists of:
  a first two of the four single layer sides of each of the one or more expandable pet tunnels having a series of vertical, horizontal and diagonal creases; and
  a second two of the four single layer sides of each of the one or more expandable pet tunnels having a series of vertical creases.

6. The expandable pet tunnel system of claim 1 further comprising a connector box comprised of kraft paper and configured to transition between a substantially flat collapsed state and an expanded state, wherein:
  the connector box, in the expanded state, defines a cube comprising at least two entry/exit portals;
  a first two of the six sides of the cube defined by the connector box when in the expanded state each consists of a vertical crease; and
  a second two of the six sides of the cube defined by the connector box when in the expanded state each consists of a series of vertical and diagonal creases.

* * * * *